2 Sheets—Sheet 2.

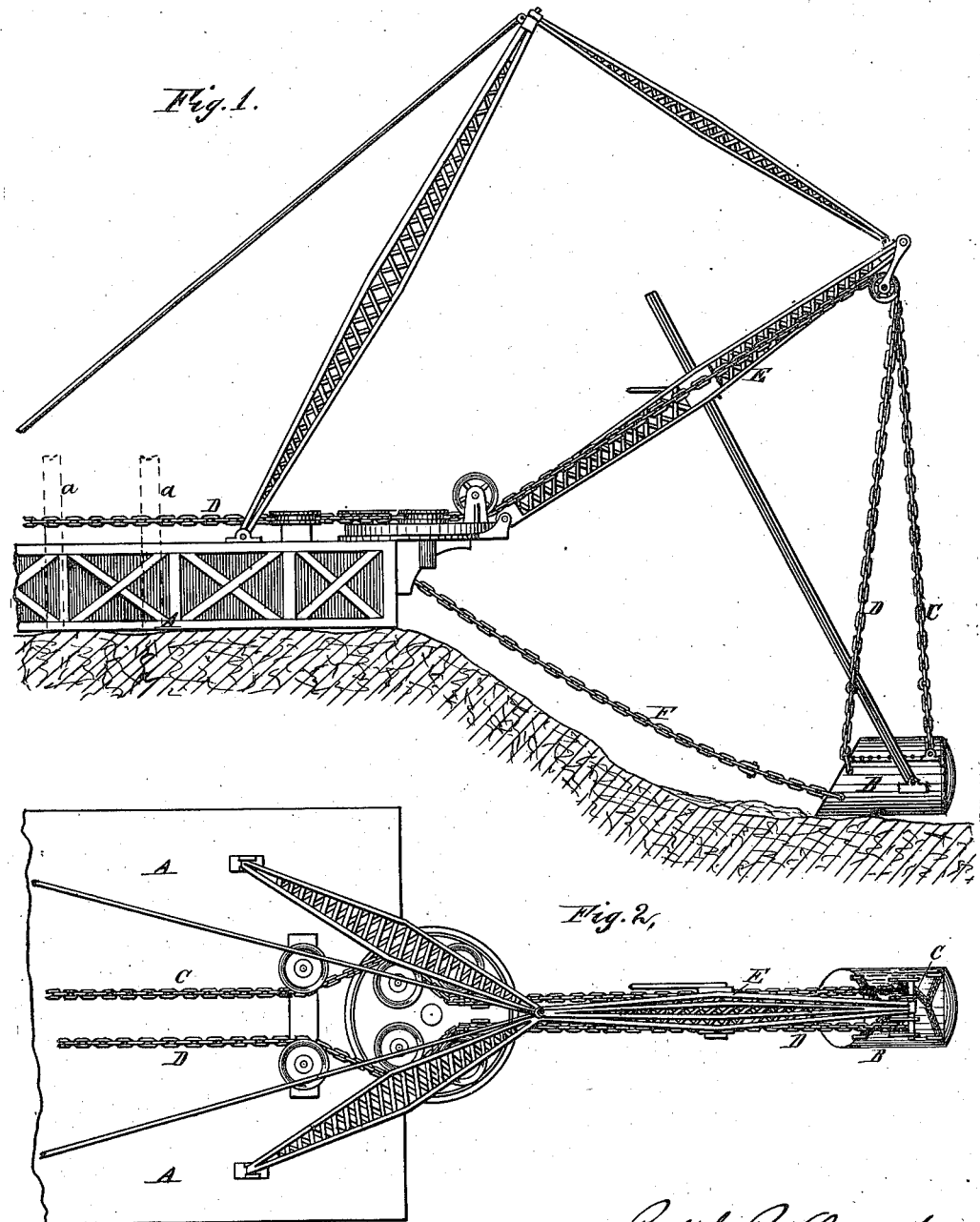

R. R. OSGOOD.
Excavating and Dredging Machine.

No. 226,874. Patented April 27, 1880.

Attest:
Charles R. Searle.
T. Downs.

Ralph R. Osgood,
Inventor:
By Worth Osgood
Attorney.

UNITED STATES PATENT OFFICE.

RALPH R. OSGOOD, OF TROY, NEW YORK.

EXCAVATING AND DREDGING MACHINE.

SPECIFICATION forming part of Letters Patent No. 226,874, dated April 27, 1880.

Application filed November 6, 1879.

*To all whom it may concern:*

Be it known that I, RALPH R. OSGOOD, of Troy, county of Rensselaer, and State of New York, have invented certain new and useful Improvements in Excavators or Dredges, of which the following is a full, clear, and exact description, reference being had to the accompanying drawings, and to the letters of reference marked thereon.

Figure 3:
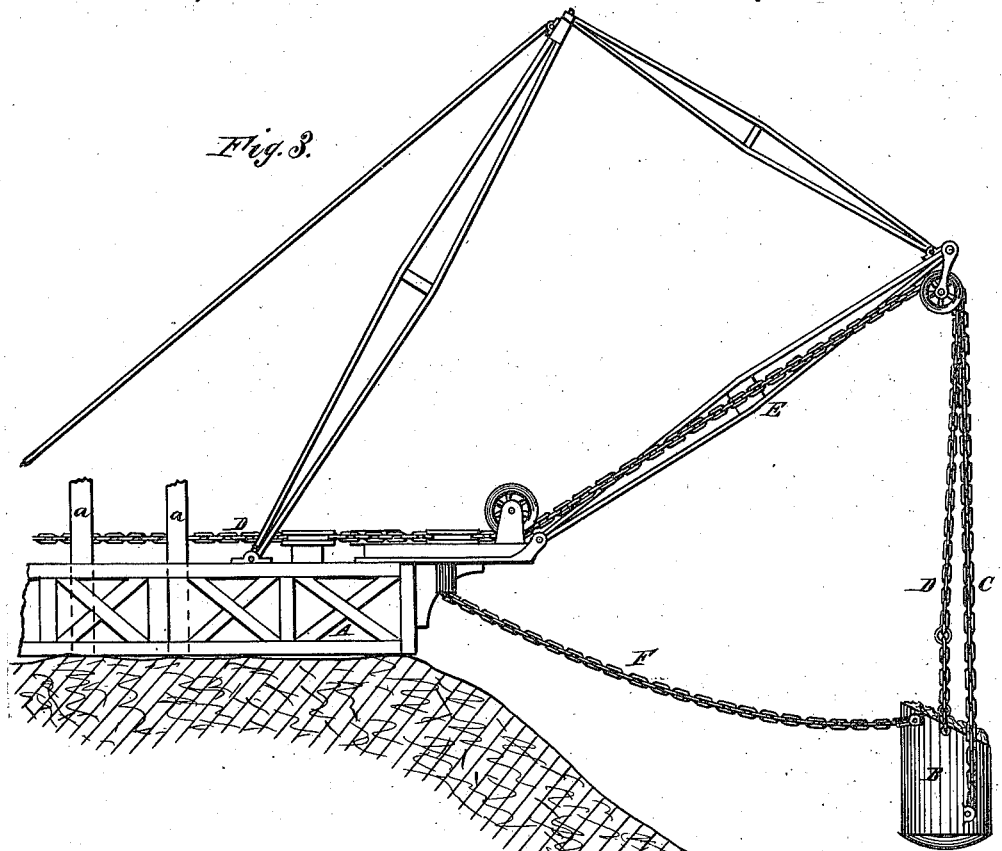
Figure 4:
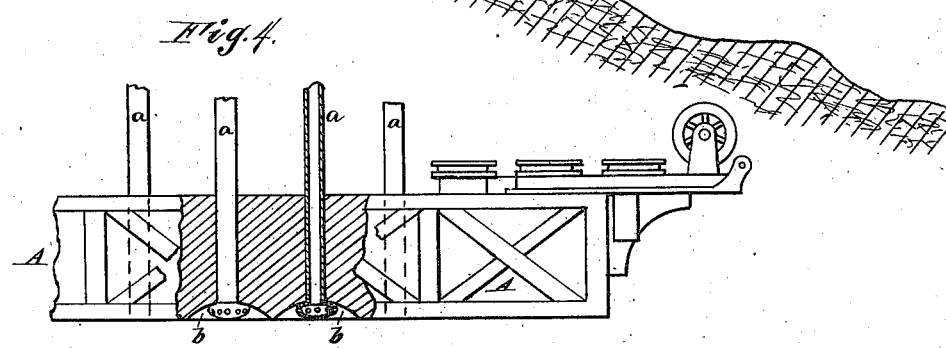

Figure 1 is an elevation or side view of a machine constructed in accordance with my improvements and involving the principles of my invention, the view showing so much of the details of construction as is necessary for purposes of the present description. Fig. 2 is a plan view of machine indicated in Fig. 1. Fig. 3 is a view similar to Fig. 1, showing the dipper or scoop mounted without a handle; and Fig. 4 is a sectional view, indicating the construction and arrangement of the steam, water, or lubricating-fluid ejectors.

Like letters in all the figures, wherever they occur, indicate corresponding parts.

My invention has relation to that class of machines employed for the purpose of excavating or dredging, either upon the land or in the water, which machines are ordinarily denominated "excavators" or "dredges," the object of the invention being to simplify and cheapen the construction; to increase the effective working power, and thus the capacity, of the machine; to augment the ease with which the machine may be handled or operated at different stages of the work, render it less liable to get out of order than heretofore, and to better adapt it for use upon soft earth, as in swamps, marshes, &c. To accomplish all of this the invention involves certain new and useful arrangements or combinations of parts and peculiarities of construction and operation, all of which will be hereinafter first fully described, and then pointed out in the claims.

In the figures of the drawings chosen to illustrate the principles of the invention, the improved machine is shown as mounted upon a platform, such as is suitable for use upon soft ground; but, as will hereinafter appear, the style or form of the platform is not a material feature of the invention, since this may be changed at pleasure to correspond with the kind of work which is to be accomplished. It should, of course, be firmly and well built, capable of solidly supporting the surmounting machinery and withstanding the various strains to which it may be subjected.

It has not been deemed necessary to indicate any particular construction of the platform; but for use upon soft ground the bottom thereof may be supposed to be plain and smooth, so that it may be the more easily moved along.

The platform A supports all the working parts of the machine, and rests directly upon the ground or surface of the material to be excavated. The dipper or scoop B projects over one end, and as the excavation progresses the entire machine is drawn backward by use of suitable anchors and drawing-cables in the rear. The cables may be strained and the machine moved by its own engine in a manner readily understood. The scoop is filled by being drawn toward the machine.

Such being the manner of its operation, it will be observed that the machine moves over the material to be excavated, and the bank (which is the surface cut) follows up the machine, instead of the machine being made to follow up the bank.

The operation of the old style of dredge or excavator upon soft ground presents practical difficulties, for the reason that it must first cut the channel in which to rest, and when located therein its withdrawal necessitates a dismounting of the apparatus and removal by parts. Upon the bottom of a channel so cut the use of cars to carry away the material is out of the question; and if the old style of forward-cutting machine be employed the material would have to be dumped upon the margin of the cut, where it would be liable to settle back again by its own gravity.

When made to slide along upon the surface of the ground, as in the illustration, without tracks or ways, the pressure per square inch and the friction due thereto is considerable, so that some means of lubricating the bottom is desirable. This may be conveniently accomplished by injecting steam, water, or other lubricating fluid through the platform, for which purpose I provide suitable pipes, as at $a$ $a$, at any desired intervals, and connect them with the steam-boiler or other source of supply. It is found that if these pipes open directly through the floor the fluid will only effect the blowing-out of a pocket beneath them, which accomplishes only a limited amount of good in the direction sought. For this reason it will be found advisable to locate the discharge-orifices at the sides of the conductors; and I therefore prefer to cut a channel or groove, as at $b$, in the under surface of the platform, to carry the discharge ends of pipes $a$ into such channel, and to cut the orifices in the sides of the pipe sections or caps, as plainly shown. This arrangement affords a means of projecting the lubricating fluid thoroughly between the two surfaces of contact, and when they are so lubricated the movement of the machine is a comparatively easy matter.

The bucket, scoop, or dipper B, being made of metal, is of considerable weight, and hence, by its own gravity, will assume its proper cutting position upon the bank whenever lowered down for work. It is supported by two chains or cables, C and D, the one, C, being attached near the rear end, the other, D, near the mouth, both being so connected with the hoisting-drums that they may be moved independently or simultaneously, for reasons which will hereinafter appear. These two chains or cables are preferably suspended from a boom, E, which possesses many advantages over the old form of crane and its attendant weighty crane-post and general bulky unwieldy nature. The boom may be of the form and general construction indicated in previous patents granted to me, or it may be of any approved pattern suitable for the purpose. The turn-table, with its superposed directing-sheaves, may be of the style indicated in my patent of October 23, 1877, No. 196,378, by use of which I am enabled to turn the boom from side to side, employing only the hoisting-chains, and thus obviating the necessity of other expensive attachments for that purpose.

The presence of the dipper-handle (shown in Fig. 1) is not essential to the successful operation of the machine, though for some purposes and in some localities its use might be advisable, since it will serve, in a measure, to steady the dipper in its movements, and might in some cases, by clamping it, as pointed out in previous patents to me, assist in starting the dipper into its work.

The dipper being dropped down to its working position, its snout is canted toward the bank by hoisting slightly on chain C, leaving it in about the position indicated in Fig. 1. By manipulating the two independent chains C and D, it is evident that the dipper may be easily disposed so as to cut deeper or more shallow, according to the requirements of the case or the pleasure of the operator.

Being properly disposed for the cut the dipper is pulled into the bank by the independent pulling-chain F drawing it always, for the purpose, in a direction toward the machine. During this pulling, by holding the hoisting-chains C and D taut the dipper may be made to swing in the arc of a circle the center of which is in the boom-sheaves from which these chains depend; or, if a somewhat longer drag be required, the hoisting-chains may be allowed to run freely, and the dipper pulled in a straight line by the chain F. When the dipper is filled the chain F is unclutched, and chains D and C made to do the hoisting, care being taken not to run C much more rapidly than D, and the pulling-chain being allowed to follow freely with the upward movement of the dipper.

All the hoisting might, under certain circumstances, be done by the chain D alone; but it is better to run both hoisting-chains together, since, when elevated, the chain C operates as a dumping-chain, and must first be drawn taut. When sufficiently elevated the dipper is swung around as desired by means of chain C or D, or otherwise, and dumped by simply elevating the rear end through the medium of chain C, after which it may be again returned to its working position on the bank.

The dipper arranged and operating in this way requires no bottom door or lid, and is thus less expensive than the usual forms of dippers.

The pulling-chain, being independent of the hoisting-chains, may be graduated in weight and strength for its particular part of the work, as also may the hoisting-chains, and this greatly in advantage over the former styles, wherein the hoisting and working chains were identical.

In the matter of repairs this construction of machine affords many facilities over previous forms, as will be apparent from a consideration of its simplicity.

The ordinary forms of spuds may be applied for holding the improved machine against the strain required to force the dipper into the bank; but, if desired, this strain may be counteracted by leaving the anchor-chains in place during the excavating, since the strain is always in a direction from the anchorage, and this affords a convenient means of holding the machine.

The machine may be mounted upon a track, if desired, when, of course, the lubricating contrivances will be of no avail.

It is regarded as practically essential that the dipper should be exposed to view during the working of the machine, in order that the operating chains may be manipulated at the proper time and in proper relative situations, so that for under-water excavators or dredges the before-mentioned principles of operation are not so readily applicable.

It sometimes occurs, however, that the dipper must be hidden from view, and when this occurs any readily distinguishable mark or object may be placed upon the chains C and D to indicate their relative lengths, by which the cant of the dipper can be easily determined.

The two chains C and D might be united by a short coupling-chain of such length as to insure their simultaneous movement after either has moved a certain distance; and with these appliances the operation of the dipper under water may be easily continued, in view of which it is not intended to restrict the prominent principles of the invention to a machine mounted upon a single platform or any support whereon its numerous characteristics will recommend it for use.

The chains or cables may, of course, be bent upon pulleys in the usual way for increasing the working power, and the details of construction and mounting the requisite attachments should be such as to insure the essential strength and durability of the several parts.

The machine being made to rest upon the material to be cut, the carrying-cars may be run along upon the natural surface of the ground upon either side of the excavator, and are thus not confined to the channel cut out, which is not the case with previous methods of cutting and delivery.

Having thus fully described my invention, what I claim as new, and desire to secure by Letters Patent, is—

1. In a machine of the character herein specified, the combination, with the floor or platform, of an underlying steam or water pipe adapted to conduct the lubricating fluid into contact with the surface upon which the machine is made to rest, substantially as and for the purposes set forth.

2. In a machine of the character herein specified, the combination, with the floor or platform, of a steam or water pipe section located within a suitable recess in the under side of said platform and adapted to conduct the lubricating fluid into contact with the surface upon which the machine is made to rest, substantially as and for the purposes set forth.

3. In a machine of the character herein specified, the combination, with the floor or platform, of a steam or water pipe section or cap located within a suitable recess in the under side of the platform, the said section or cap having side perforations and adapted to conduct the lubricating fluid into contact with the surface upon which the machine is made to rest, substantially as shown and described.

4. The herein-described excavator, composed essentially of a platform or support, the operating machinery mounted thereon and movable therewith, and the dipper or scoop swung therefrom in independently-operating supporting-chains, and dragged into the bank in a direction toward the movable platform by a dragging or pulling chain leading from the platform, substantially as shown and described.

5. In an excavator of the character herein specified, the combination of the dipper and its two attached independently-moving hoisting-chains, by which its working position on the bank may be controlled, the pulling or dragging chain independent of said hoisting-chains, and the swinging boom or crane, all mounted upon and movable with the movable platform A, substantially as and for the purposes set forth.

6. In an excavator of the character herein specified, the combination, with the dipper and its two attached independently-moving hoisting-chains, of the pulling or dragging chain, independent of said hoisting-chains, substantially as set forth.

7. In an excavator of the character herein specified, the combination of the platform, the swinging boom, the hoisting-chains, the swinging dipper, and the pulling-chain, independent of said hoisting-chains, substantially as shown and described.

8. In an excavator of the character herein specified, the combination of the backwardly-sliding platform, the swinging boom, the independent hoisting-chains, the swinging dipper, and the independent pulling-chain, adapted to draw the dipper into the bank in a direction toward the platform, substantially as shown and described.

In testimony that I claim the foregoing I have hereunto set my hand in the presence of two witnesses.

RALPH R. OSGOOD.

Witnesses:
S. W. HOLCOMB,
WORTH OSGOOD.